(12) United States Patent
Goncharov et al.

(10) Patent No.: US 10,414,003 B2
(45) Date of Patent: *Sep. 17, 2019

(54) WELDING MATERIAL FOR WELDING OF SUPERALLOYS

(71) Applicant: Liburdi Engineering Limited, Dundas (CA)

(72) Inventors: Alexander B. Goncharov, Toronto (CA); Joseph Liburdi, Dundas (CA); Paul Lowden, Cambridge (CA)

(73) Assignee: Liburdi Engineering Limited, Dundas, Ontario ( * ) Notice: Subject to any disclaimer, the term of this patent is extended or adjusted under 35 U.S.C. 154(b) by 290 days.

This patent is subject to a terminal disclaimer.

(21) Appl. No.: 14/263,120

(22) Filed: Apr. 28, 2014

(65) Prior Publication Data
US 2015/0093284 A1 Apr. 2, 2015

Related U.S. Application Data

(60) Provisional application No. 61/884,169, filed on Sep. 30, 2013.

(51) Int. Cl.

| | |
|---|---|
| *B23K 35/30* | (2006.01) |
| *B23K 35/02* | (2006.01) |
| *C22C 19/05* | (2006.01) |
| *C22C 38/22* | (2006.01) |
| *C22C 38/40* | (2006.01) |
| *C22C 38/44* | (2006.01) |
| *C22C 38/54* | (2006.01) |
| *C22C 38/02* | (2006.01) |
| *C22C 38/04* | (2006.01) |
| *C22C 38/48* | (2006.01) |
| *C22C 38/50* | (2006.01) |
| *C22C 38/58* | (2006.01) |

(52) U.S. Cl.
CPC ........ *B23K 35/304* (2013.01); *B23K 35/0244* (2013.01); *B23K 35/0261* (2013.01); *B23K 35/308* (2013.01); *B23K 35/3033* (2013.01); *B23K 35/3066* (2013.01); *B23K 35/3086* (2013.01); *C22C 19/055* (2013.01); *C22C 19/056* (2013.01); *C22C 38/02* (2013.01); *C22C 38/04* (2013.01); *C22C 38/22* (2013.01); *C22C 38/40* (2013.01); *C22C 38/44* (2013.01); *C22C 38/48* (2013.01); *C22C 38/50* (2013.01); *C22C 38/54* (2013.01); *C22C 38/58* (2013.01)

(58) Field of Classification Search
CPC .................................................. C22C 19/055
See application file for complete search history.

(56) References Cited

U.S. PATENT DOCUMENTS

| | | | | | |
|---|---|---|---|---|---|
| 3,228,095 | A | * | 1/1966 | Bird | B21K 3/04 |
| | | | | | 148/428 |
| 3,798,075 | A | * | 3/1974 | Bendel | C22C 38/54 |
| | | | | | 148/326 |
| 4,363,659 | A | * | 12/1982 | Hickl | C22C 19/053 |
| | | | | | 420/454 |

FOREIGN PATENT DOCUMENTS

| | | | | | |
|---|---|---|---|---|---|
| GB | | 2039950 A | * 8/1980 | ........... | B23K 35/304 |

* cited by examiner

*Primary Examiner* — Christopher S Kessler
(74) *Attorney, Agent, or Firm* — Ridout & Maybee LLP

(57) ABSTRACT

Welding material for welding of superalloys comprising boron with the range of 0.3-0.8 wt. % B, 0.2-0.8 wt. % C, 17-23 wt. % Cr, 0.35-10 wt. % Mo, 0.1-4.15 wt. % Nb with nickel or iron and impurities to balance for weld repair of engine components manufactured of precipitation hardening superalloys with high content of gamma prime phase at an ambient temperature.

4 Claims, 9 Drawing Sheets

WELDING MATERIAL FOR WELDING OF SUPERALLOYS

The present application claims priority from U.S. Provisional application 61/884,169 filed on Sep. 30, 2013 by Alexander B. Goncharov, Joseph Liburdi and Paul Lowden under the title WELDING MATERIAL FOR WELDING SUPERALLOYS and incorporate the entire content of this U.S. provisional patent application into the present application.

Alloy 625, which comprises 20-23 wt. % Cr, 8-10 wt. % Mo, 3.15-4.15 wt. % Nb, 0.1 wt. % C and nickel with impurities to balance, also known as Inconel 625 manufactured to AMS 5879, has good oxidation resistance at temperatures up to 980° C. (1800° F.), mechanical properties up to 870° C. (1598° F.) and provides good resistance to aqueous corrosion. As a result, this alloy has been widely used in aerospace, chemical and power generation industries for decades.

Also, due to unique metallurgical propertied Inconel 625 manufactured as per AMS 5837 in a form of welding wire and rods has been used for crack repair and dimensional restoration of turbine engine components by GTAW, laser and plasma welding and cladding.

Inconel 625 produces sound welds but the heat affected zone (HAZ) of Inconel 738, GTD 111, GTD 222, Inconel 713 and some other precipitation hardening superalloys with high content of gamma prime phase ($\gamma'$) is prone to micro cracking known also as microfissuring as per Banerjee K., Richards N. L., and Chaturvedi M. C. "Effect of Filler Alloys on Heat Affected Zone Cracking in Pre-weld Heat Treated IN-738 LC Gas-Tungsten-Arc Welds", Metallurgical and Materials Transactions, Volume 36A, July 2005, pp. 1881-1890.

Low creep properties is another major disadvantage of this alloy that limits it application for the repair of highly stressed structural and containment engine components. Currently, Haynes 230 welding wire manufactured to AMS 5839 as well as other more superior materials are used in lieu of Alloy 625 for a weld repair of these engine components. However, welding of Inconel 738 and GTD 111 superalloys with Haynes 230 welding wire aggravates the HAZ cracking.

Boron and some other melting point depressants are used to prevent HAZ cracking by the reducing the solidus-liquidus range of a welding pool and overheating of HAZ. However, large amount of boron further reduces creep and rupture properties of welds produced using Inconel 625 alloy.

From other hand, the insufficient boron content in nickel based alloy that was described in U.S. RE 29920 and RE 28681, which are similar to Inconel 625, and comprise 0.05-0.3 wt. % B, up to 0.35 wt. % C from 5 to 22 wt. % Cr, up to 8 wt. % and up to 3 wt. % Nb, do not prevent HAZ cracking of GTD 111 alloy as was found by experiments.

Niobium free nickel-chromium-molybdenum based alloys with boron content of (0.04 wt. %-0.8 wt. %) and carbon (0.12 wt. %-1.2 wt. %) such as alloys described by U.S. Pat. No. 3,918,964, as well as similar alloys described in patents U.S. Pat. No. 4,363,659, U.S. Pat. No. 3,428,442 have been used mostly only for hardfacing. As a rule, hard facing alloys have low rupture and low cycle fatigue properties and can't be used for a structural repair of turbine engine components.

Therefore, a significant improvement of Inconel 625 as well as other nickel and iron based welding materials is required to increase mechanical properties of welds at a high temperature avoiding at the same time HAZ cracking of Inconel 738, GTD111 and other superalloys with high content of $\gamma'$ phase.

BRIEF DESCRIPTION OF THE INVENTION

We have found that the welding material comprising 0.3-0.8 wt. % of boron (B), 0.2-0.8 wt. % of carbon (C), 17-23 wt. % of chromium (Cr), 8-10 wt. % of molybdenum (Mo), 0.1-4.15 wt. % of niobium (Nb) and nickel or iron with impurities to balance produces high strength welds which minimize and often eliminate cracking in the HAZ of Inconel 738, GTD 111 and other nickel based superalloys and improve mechanical properties of welds on various nickel and iron based alloys.

Advantages of the Current (Invented) Alloy
1) Produces welds with superior mechanical properties at temperature up to 980° C. (1800° F.). Rupture properties of welds at 980° C. (1800° F.) exceeds rupture properties of standard Inconel 625 and Haynes 230 as shown in Table 3.
2) Allows welding of Inconel 738 and GTD 111 and other high gamma prime nickel based superalloys at an ambient temperature while minimizing or eliminating HAZ cracking.
3) Produces ductile welds at an ambient temperature allowing cold working of repair sections.
4) Welding wire can be manufactured using standard low cost drawing processes.
5) A preferable embodiment of the current alloy having carbon and boron content of 0.2-0.4 wt. % can be used for the crack repair of engine components while embodiments with carbon content of 0.3-0.8 wt. % can be used for hard facing.

The nickel based welding material may be a welding wire.
The nickel based welding material may also be a welding powder.

The nickel based welding material may be a repair section of a turbine engine component, where in the welding material with a carbon content of 0.2-0.3 wt. % and boron content of 0.3-0.4 wt. % substitutes the cracked section of the engine component, and welding material with a carbon content of 0.3-0.8 wt. % and boron content of 0.5-0.8 wt. % is applied to the section of the engine component that is subjected to wear and fretting in service conditions.

As per other preferable embodiments the nickel based material may be an article of a particular engine component such as shrouds, vanes, casings, shroud support rings, air seal rings.

STANDARD ACROMYMS

Figure 1:
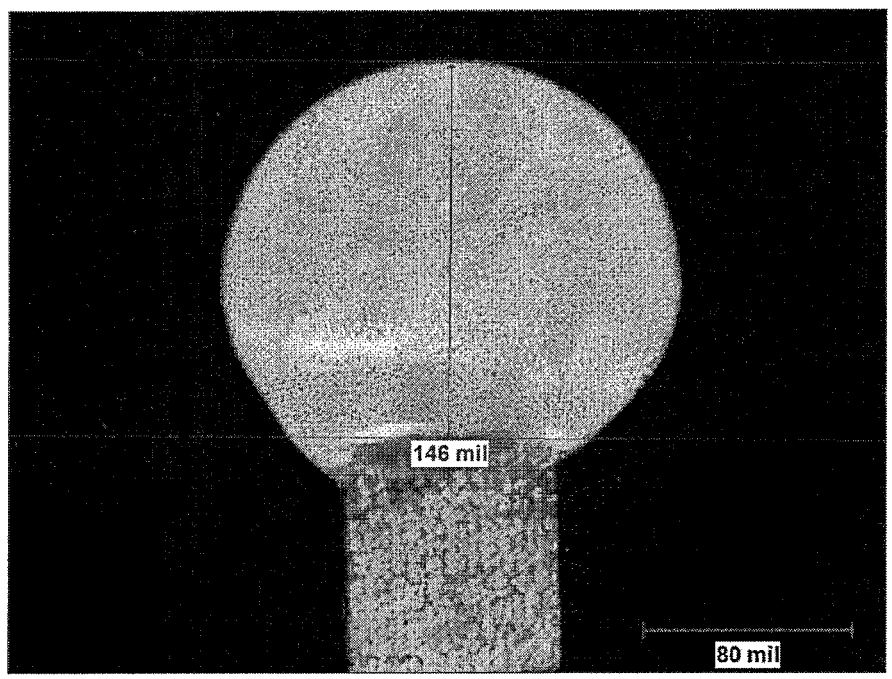
FIG. 1 is the cross section of clad welds that was produced on Inconel 738 substrate by GTAW-MA welding using the invented welding material.

AMS—Aerospace Material Specification (standards)
ASTM—American Society for Testing and Materials (standards)
AWS—American Welding Society (standards)
HAZ—Heat Affected Zone
NDT—Non Destructive Testing
OEM—Original Equipment Manufacture
PWHT—Post Weld Heat Treatment
SS—Stainless Steel

GLOSSARY AND TERMS (DEFINITIONS)

Alloys—metal compounds consisting of a mixture of two or more materials. Superalloys—metallic materials with oxidation resistance and mechanical properties for service at elevated temperatures.
Argon Quench—introducing argon into a vacuum heat treatment chamber at annealing temperature that results in a rapid cooling of alloys to an ambient temperature.
Austenite—a solid solution of one or more elements in the face-centered cubic phase.
Base Metal or Material—one of the two or more metals to be welded together to form a joint.
Borides—compounds consisting of two elements of which boron is the more electronegative one. Boron form borides with metal and non-metal elements.
Carbides—compounds composed of carbon and a less electronegative element. Carbon can produce carbides with metals (such as chromium, niobium, molybdenum, tantalum, titanium, tungsten, and other metals of IVB, VB and VIB groups) and non-metal (such as boron, calcium, or silicon). Metal carbides are characterized by their extreme hardness and resistance to high temperatures.
Cast Nickel Alloys—alloys containing nickel that has been poured or cast as a liquid into a mold and cooled into a solid shape.
Cladding—the process of the application of a relatively thick layer (>0.5 mm (0.02 in.)) of welding material and/or composite welding powder for the purpose of improved wear and/or corrosion resistance or other properties and/or to restore the part to required dimensions with minimum penetration into the base material.
Cold Rolling—a process that carried out at a temperature below of the recrystallization temperature of alloy.
Cold Working—shaping of metal at temperatures substantially below the point of recrystallization. Cold working adds strength and hardness.
Crack—fracture-type discontinuity that is characterized by a sharp tip and high ratio of length to width, usually exceeding three (3).
Crack Free Weld—weld that are free of linear indications with length equal or greater of 0.004 inch (0.1 mm) detected either by radiographic or fluorescent penetration inspection without magnification or metallographic examination of welds
Cracking—fracture that develops in the weld during or after solidification of a welding pool is completed.
Creep (Properties)—is the tendency of a solid material to move slowly or deform permanently under the influence of stresses. Creep occurs when a metal is subjected to a constant tensile load at an elevated temperature.
The Creep and Rupture Tests—are tests that carried out by applying a constant load to a tensile specimen maintained at a constant temperature according to ASTM E139. The rupture test in carried out in a similar manner to the creep test but at a higher stress level until the specimen fails and the time at failure is measured. Time prior to rupture at given loading is used to characterize rupture properties of materials.
Dilution—the change in a chemical composition of a welding material caused by the admixture of the base material or previous weld metal in the weld bead that is measured by the percentage of the base metal or previous weld metal in the weld bead.
Discontinuity—an interruption of the typical structure of a weld metal, such as a lack of homogeneity in the mechanical, metallurgical or physical characteristics of the base or weld metal.
Drawing—a process in which wire is pulled through either a single drawing die or series of dies.
Ductility—ability of metals and alloys to be drawn, stretched, or formed without breaking.
Fissuring—small crack-like discontinuities with only slight separation (opening displacement) of the fracture surfaces. The prefixes macro—or micro—indicate relative size.
Fusion Welding—the welding process that used fusion of the base metal to make the weld.
Gamma ($\gamma'$) Phase—the continuous matrix (called gamma) is a face-centered-cubic (fcc) nickel-based austenitic phase that usually contains a high percentage of solid-solution elements such as Co, Cr, Mo, and W.
Gamma Prime ($\gamma'$) Phase—the primary strengthening phase in nickel-based superalloys is a compound consisting of nickel and either aluminum or titanium Ni3Al or Ni3Ti that coherently precipitates in the austenitic $\gamma$ matrix.
Gas Atomization—the process to manufacture high quality metal powders by forcing a molten metal stream through an orifice and atomizing it by inert gas jets into fine metal droplets followed by rapid cooling.

Gas Tungsten Arc Welding (GTAW)—in accordance with the AWS definition it is the arc welding process that produces coalescence of metals by heating them with an arc between a tungsten (non-consumable) electrode and the work also known as a base material. Shielding is obtained from a gas or a gas mixture. Pressure may or may not be used and filler metal may or may not be used.

Hardness—ability of metals and alloys to resist indentation, penetration, and scratching.

Heat Affected Zone (HAZ)—the portion of the base metal that has not been melted, but whose mechanical properties or microstructure were altered by the heat of welding.

Heat Treatment—the controlled heating and cooling processes used to change the structure of a material and alter its physical and mechanical properties.

Hot Rolling—a process that carried out at a temperature exceeding the recrystallization temperature of alloy.

Induction Melting—a process in which an induced electrical current known also as Eddy Current heat and melt metals and alloys.

Laser Beam Welding and Cladding (LBW)—in accordance with AWS definition it is a welding process that produces coalescence of materials with the heat obtained from the application of concentrated coherent light beam impinging upon the joint or base material respectively.

Linear Discontinuities—weld defects with the ratio of a length to a with 3:1 or greater.

Multi Pass Cladding and Welding—a weld that is formed by two or more passes.

Nickel Based Superalloys—materials whereby the content of nickel exceeds the content of other alloying elements.

Plasma Arc Welding (PAW)—in accordance with AWS definition it is an arc welding process that produces coalescence of metals by heating them with a constricted arc between an electrode and the workpiece (base metal) known also as transferred arc or the electrode and the constricting nozzle known also as non-transferred arc.

Precipitation Heat Treatment or Hardening—the process of heating of alloys to a temperature at which certain elements precipitate, forming a harder structure, and then cooling at a rate to prevent return to the original structure.

Recrystallization—is a formation of a new, strain-free grain structure from existing one that usually accompanied by grain growth during heating.

Recrystallization Temperature is an approximate temperature at which complete recrystallization of an existing grain structure occurs within a specified time.

Rolling—a process in which metal stock is passed through a set of mechanically driven rolls.

Rupture Strength—is a nominal stress developed in a material at rupture, which in not necessarily is equal to ultimate strength.

Solidification Shrinkage—the volume contraction of a metal during solidification.

Solution Heat Treatment—the heat treatment method that is used to heat alloys to a specific temperature for a certain period of time allowing one or more alloying elements to dissolve in a solid solution and then cool rapidly.

Ultimate Tensile Strength (UTS)—the resistance of a material to longitudinal stress, measured by the minimum amount of longitudinal stress required to rupture the material.

Weld—a localized coalescence of metal or non-metals produced either by heating the materials to the welding temperature, with or without the application of pressure, or by the application of pressure alone, with or without the use of welding material.

Weld Bead—a weld resulting from a pass.

Weld Defects—discontinuities that by nature or accumulated effect render a part or product unable to meet minimum applicable acceptance standards or specifications.

Weld Pass—a single progression of a welding or cladding operation along a joint, weld deposit or substrate. The result of a pass is a weld bead, layer or spray deposit.

Weld Pool—the localized volume of molten metal in a weld prior to its solidification as weld metal.

Weldability—ability of a material to be welded under imposed conditions into a specific, suitable structure and to perform satisfactorily for its intended use.

Welding—the material joining processes used in making welds.

Welding Powder—the welding material in a form of powder that is added in making of welded joints or clad welds.

Welding Rods—welding wire cut to a standardized length.

Welding Wire—welding material in a form of wire that is added in making of welded joints or clad welds.

Wrought Nickel Alloys—nickel based alloys that have been bent, hammered, forged or physically formed into a desired shape. Wrought nickel alloys are often welded under the same conditions as certain types of steel.

Yield Strength—the ability of a metal to tolerate gradual progressive force without permanent deformation.

Planishing—is a metalworking technique that involves finishing the surface by finely shaping and smoothing sheet metal.

DETAILED DESCRIPTION OF THE INVENTION

The invented alloy can be used in a form of casting, wrought materials, plates, strips, sheets and welding materials in forms of welding wires and powders. Welding materials in a form of welding wires, rods and powders as the major application of the invented alloy are discussed below in more details.

Ingots, also known as billets, for a manufacturing of welding wire and powder are produced in vacuum or argon using standard induction melting technologies and equipment or other melting processes.

For a manufacturing of welding wire billets are usually produced in a form of rods with a diameter exceeding 0.75 inch that are reduced to a diameter of 0.5 inch by rolling or extrusion at a high temperature followed by standard surface finishing.

Nickel based alloys in accordance with the present concept for a manufacturing of a welding wire for a crack repair with boron content of 0.4-0.5 wt. % and carbon content of 0.2-0.4 wt. % and iron based alloys with boron content of 0.3-0.4 wt. % and carbon content of 0.2-0.3 wt. % are ductile at temperatures below the recrystallization temperature. Therefore, manufacturing of welding wire using alloys with low content of boron and carbon can be done by cold rolling. During cold rolling the rod stock with the initial diameter of 0.5-0.75 inch is reduced down to 0.020-0.062 inch. The cold rolling increases the yield strength and hardness. Therefore, to increase ductility the metal stock is subjected to annealing heat treatment every so often to allow restoration of workability.

Welding wire with high hardness, also known as hardfacing welding wire with content of boron and carbon respectively of 0.5-0.8 wt. % has low ductility at low temperatures. Therefore, for manufacturing of hardfacing weld wire standard hot rolling or extrusion processes are used. The hot extrusion process consists of assembling of a billet housing that contains rods of desired chemical composition. The billet is then prepared for the extrusion. Billets are heated to a temperature exceeding the recrystallization temperature to avoid hardening and ease extrusion.

During final processing the wire is passed through a standard rigorous cleaning procedure that ensures the welds are free from contamination.

After cleaning the wire is cut to a required length for a manufacturing of welding rods for a manual GTAW-MA or butt welded together and spooled for the automatic GTAW-ME, laser of plasma welding.

Welding powder of 45-75 μm in diameter is manufactured by standard gas atomization processes. During this process the melted alloy is atomized by inert gas jets into fine metal droplets, which cool down during their fall in the atomizing tower. Metal powders obtained by gas-atomization have a perfectly spherical shape and high cleanliness level. Welding powder is used for plasma, microplasma and laser welding and cladding. Welding powder is fed into the welding pool with a jet of argon using standard powder feeders.

After solidification welding powder is fused with the base material producing the weld metal. To reduce overheating and prevent HAZ cracking, welding and cladding are carried out with minimum dilution. The best results in cladding were achieved with a dilution of 5-15%.

Boron and carbon within the specified ranges produced two beneficial effects for achieving the objectives of the current invention.

Figure 2:
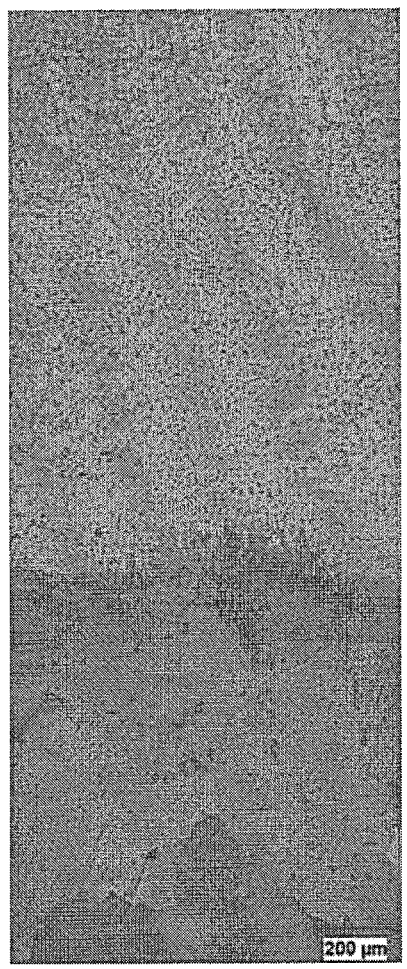
FIG. 2 is a micrograph of the weld that was produced on GTD 111 base material using welding rods comprised 0.4 wt. % B and 0.2 wt. % C that depicts the crack free HAZ at the bottom and weld build up on the top.
Figure 6:
FIG. 6 is a micrograph of the Weld Metal 3 on GTD 111 nickel base superalloy after PWHT annealing at a temperature of 1200° C. and standard aging heat treatment that depicts crack free HAZ.

First of all, boron combining with nickel reduced the melting temperature of a welding pool and overheating of the HAZ allowing a formation of crack free welds on Inconel 738 and GTD 111 as shown in FIGS. 1, 2 and 6.

Figure 3:
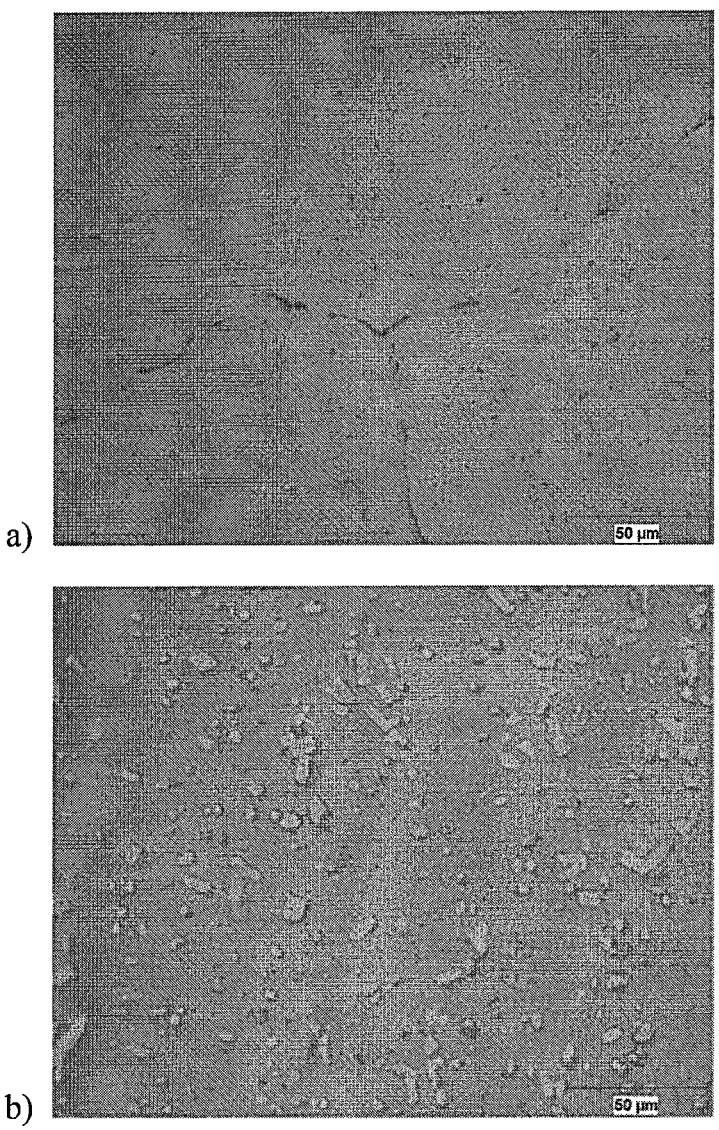
FIG. 3a is a micrograph of the homogeneous GTAW weld produced using the standard Inconel 625.
FIG. 3b is a micrograph of GTAW weld produced using Inconel 625 welding wire additionally alloyed with boron and carbon as per current invention that depicts precipitation of high strength cuboidal borides and carbides in ductile nickel based matrix.
Figure 4:
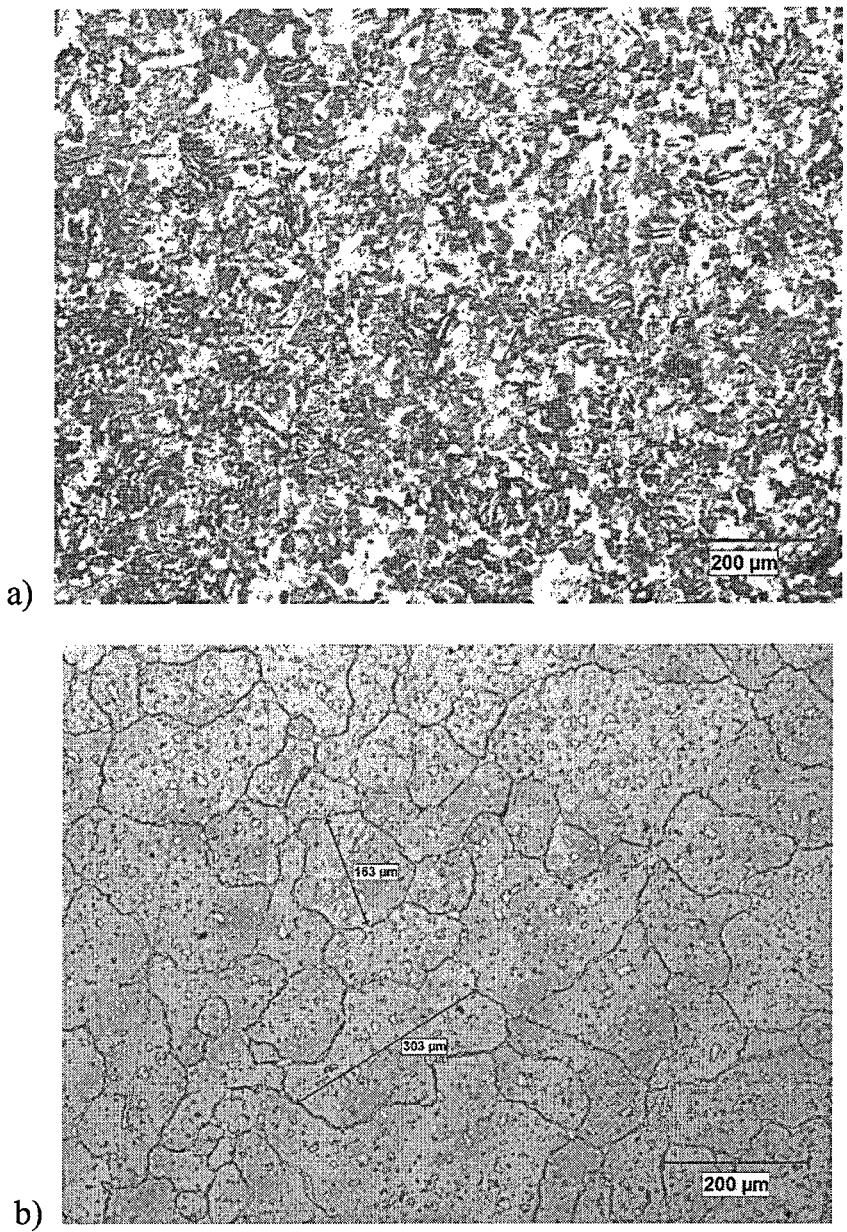
FIG. 4a is the micrograph of the homogeneous GTAW welds produced using the standard 349 stainless steel welding wire.
FIG. 4b is a micrograph of GTAW weld produced using 349 iron based welding wire additionally alloyed with boron and carbon as per current invention that depicts precipitation of high strength cuboidal borides and carbides in ductile iron based matrix.
Figure 5:
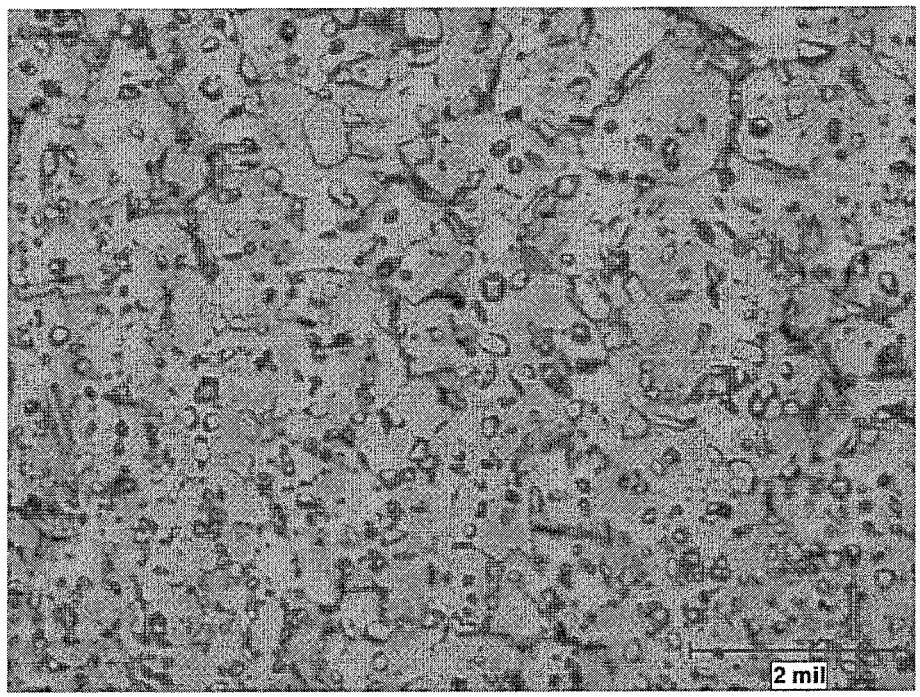
FIG. 5 depicts the microstructure of the invented nickel based alloy in the annealed condition with a uniform precipitation of high strength cuboidal borides and carbides within equiaxed grains and intergranular precipitation of carbides.

Secondly, carbon and boron formed cuboidal high strengths carbides and borides respectively with Nb, Mo and Cr in the relatively ductile Ni and Fe matrix as shown in FIGS. 3*b*, 4*b* and 5 that significantly increase ultimate (UTS) and yield strengths, microhardness as well as rupture properties of the welds as shown in Tables 2-6.

Microstructure of welds produced using standard Inconel 625 comprised almost homogeneous low strength gamma grains as shown in FIG. 3*a*. The weld metal with this structure demonstrated extremely low rupture and insufficient tensile properties as shown in Tables 3 and 2 respectively.

Welds produced using the invented nickel based alloy had a unique combination of required ductility, high strength and good rupture properties at a temperature of 982° C. (1800° F.) that significantly exceeds properties of welds produced using base line Inconel 625 and more superior Haynes 230 alloy due to a formation of cuboidal borides and carbides. Similar strengthening effect was found in welds produced using iron based welds comprised boron and carbon. Standard 347SS and 349SS welds had low mechanical properties at 872° C. (1600° F.) and microhardness at a room temperature as shown in Tables 5 and 6 respectively. Precipitation cuboidal borides and carbides in ductile austenitic Fe—Ni based matrix as shown if FIG. 4*b* significantly increased mechanical properties of welds. Despite on strengthening, these welds maintained high ductility and produced crack free welds on iron based A286 alloy.

Nickel based Weld Metal comprised 0.4-0.5 wt. % B and 0.2-0.4 wt. % C demonstrated good ductility as shown in Table 4 that allowed reshaping of engine components by planishing at an ambient temperature or preheating.

The invented alloy can be also used for a manufacturing of engine components by casting and forging followed by annealing that forms high strength equiaxed structure with precipitation of cuboidal carbides and borides in the ductile Ni based matrix shown in FIG. 5.

The weld repair of engine components using the invented alloy in a form of welding wire, rods or powder is made in accordance with AMS 2694, AMS 2685 or relevant OEM specifications and includes removing of defective area or cracks, cleaning of engine components, welding, post weld heat treatment (PWHT), that for a repair of engine components manufactured of precipitation hardening superalloys, might constitute annealing and aging or just stress relief, machining and polishing to restore the original geometry of engine components followed by non-destructive testing of welds (NDT) and dimensional inspection. Standard repair processes are well known in the art. However, the example of a turbine blade repair manufactured of GTD 111 superalloy and welded at an ambient temperature is shown in FIG. 9.

Figure 9:
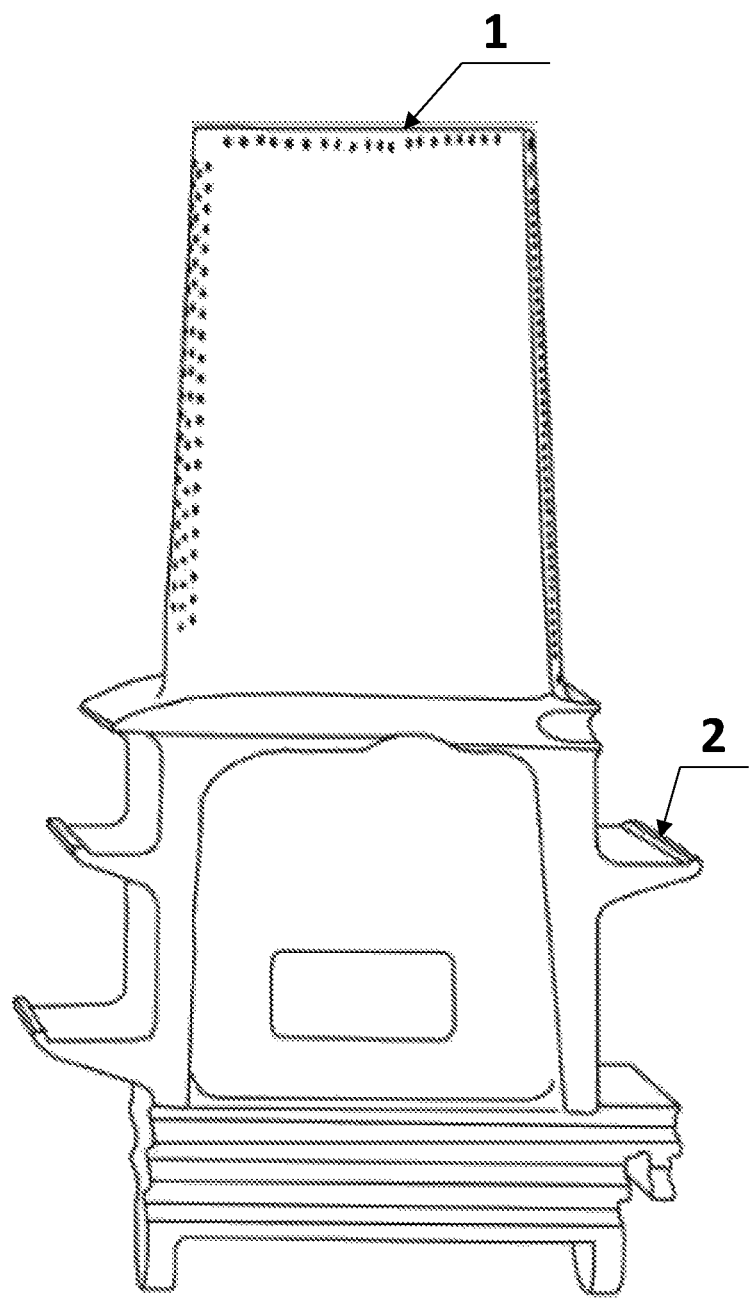
FIG. 9 depicts the stage 1 high pressure turbine blade manufactured of GTD 111 superalloy with the tip weld (1) produced using nickel based ductile welding wire comprised 0.25 wt. % C and 0.4 wt. % B and wear resistance angel wing weld (2) produced with hardfacing wire that comprised 0.6 wt. % B and 0.6% wt. C.

The tip weld 1 shown in FIG. 9 with a chemical composition corresponded to Weld Metal 3, which comprised of 0.4 wt. % B and 0.25 wt. % C, ensured high thermal fatigue properties, while the angel wing weld 2 with boron and carbon content of 0.6 wt. % and 0.8 wt. % respectively, had better resistance to wear.

Welds were free of weld defects exceeding of 0.002 inch in size in as welded condition and after PWHT that included annealing at a temperature of 1200° C. (2192° F.) and standard two stage aging at temperature of 1120° C. (2048° F.) for two hours followed by soaking for twenty four (24) hours at a temperature of 845° C. (1553° F.).

Examples of Welding of Inconel 738, GTD 111 and Inconel 625 Using Invented Alloy Eleven in total nickel and iron based welding wires with the chemical compositions shown in Table 1 were manufactured by adding different amount of boron and carbon to standard nickel based Inconel 625 and iron based SS347 and SS349 alloys using standard metallurgical methods.

Due to high susceptibility to cracking and wide range of industrial applications, IN738 and GTD111 nickel based precipitation hardening superalloys, IN625 solution hardening superalloy and A286 iron based alloy were selected for welding examples. Multi pass clad welds of 2-4 inch in length, 0.35-0.40 inch in width and 0.4-0.5 inch height were produced using GTAW-MA welding and argon shielding gas on samples manufactured of nickel based Inconel 738 and GTD 111 superalloys using Ni based welding wire and on sample manufactured of high temperature iron based alloy A289 using iron based welding wire. IN738 and GTD111 superalloys have been used for a manufacturing of buckets (blades) of Industrial Gas Turbine (IGT) engines for decades and exercise tip thermal fatigue cracking, oxidation and wear of angel wings shown in FIG. 9.

Welding parameters were selected by experiment to produce clad welds with a dilution of 10-15%. Weld current varied form 60-75A, arc voltage was within the range of 12-14, V and welding speed varied from 1.8 to 2.2 inch per minute.

Prior to welding, samples manufacture of IN738 and GDT111 were subjected to a pre-weld annealing heat treatment at a temperature of 1200° C. (2192° F.) for two (2) hours followed by an argon quench. Welding on samples manufactured of A286 iron based alloy was made without pre-weld heat treatment.

Clad welds on Inconel 738 and GTD 111 nickel based superalloys were produced using standard Inconel 625 and Haynes 230 welding wires to evaluate HAZ cracking of standard and invented welding materials. Standard 347SS and 349SS and invented iron based welding wires were used to produce clad welds on A286 alloys for evaluation of mechanical properties and susceptibility of welds to cracking.

Samples, manufactured on Inconel 738 and GTD111 superalloys, were subjected to the PWHT comprised annealing at a temperature of 1200° C. (2192° F.) for two (2) hours followed by an aging at temperatures of 1120° C. (2048° F.) for two (2) hours and 845° C. (1553° F.) for twenty four (24) hours. Two steps aging of welds on A286 iron based alloy was made at a temperature of 720° C. (1328° F.) for 16 hours followed by heating at 620° C. (1148° F.) for 16 hours.

In addition to above, Inconel 625 samples of 6×3×0.060 inch in dimensions were butt welded using GTAW-MA with standard Inconel 625 (IN625) solution hardening welding wire and invented welding alloys in a form of welding rods of 0.035 inch in diameter.

Welds on Inconel 738 and GTD 111 were evaluated for HAZ cracking. No cracks and other linear discontinuities exceeding 0.002 inch in length were observed.

Clad welds produced using nickel based welding materials were subjected to tensile and rupture testing at a temperature of 982° C. (1800° F.) as per ASTM E21 and E139 respectively. Clad welds produced using iron based welding materials were subjected to tensile testing at a temperature of 872° C. (1600° F.) as per ASTM E21 and microhardness testing at a room temperature as per ASTM E384 with loading of 300 g.

Inconel 625 butt joints were subjected to a tensile testing at a room temperature as per ASTM E8 and bend test as per ASTM E190-92.

Acceptable compositions for nickel based welding materials included those that produced crack free welds, interdendritic shrinkage with a length less than 0.004 (0.1 mm) inch and tensile and rupture properties exceeding Inconel 625 and Haynes 230 respectively at a temperature of 982° C. (1800° F.) on various substrates manufactured of precipitation hardening nickel based superalloys. Acceptable compositions for iron based welding materials included those that produce crack free welds on A286 alloy with mechanical properties exceeding properties of base line weld produced using standard 347 and 349 welding materials at least by 15% at a temperature of 872° C. (1600° F.)

Acceptable compositions for nickel and iron based welding materials included those that produced cracks, interdendritic shrinkage and other linear indication with a size exceeding 0.004 inch.

Tensile properties of clad welds at a temperature of 982° C. (1800° F.) produced using nickel based welding materials as well as HAZ cracking of Inconel 738 and GTD 111 alloys are summarised in Table 2. Rupture properties in a comparison with tensile properties of standard Inconel 625 and Haynes 230 are shown in Table 3.

Tensile properties of butt joints of Inconel 625 alloy produced using standard Inconel 625 and invented welding rods in as welded condition at a room temperature are presented in Table 4.

Tensile properties of clad welds produced using standard stainless steel 347 and 349 iron based welding materials as well as invented iron based welding materials on A286 alloys at a temperature of 872° C. (1600° F.) are summarised in Table 5.

Microhardness of clad welds produced using standard stainless steel 347 and 349 iron based welding materials as well as invented iron based welding materials at a room temperature is summarised in Table 6.

Figure 7:
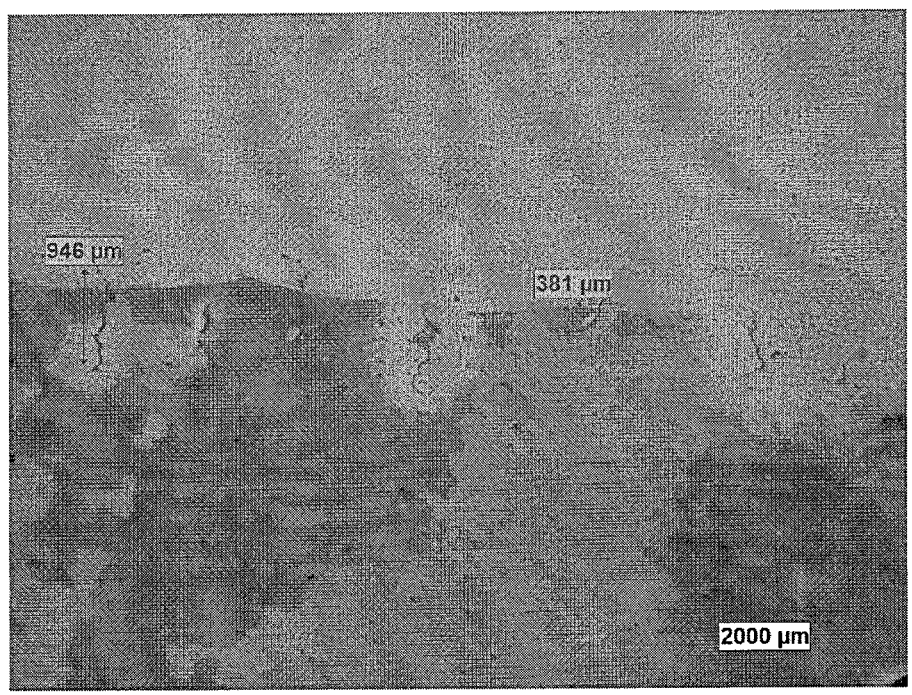
FIG. 7 is a micrograph of the Weld Metal 2A on GTD 111 base material after PWHT annealing at a temperature of 1200° C. and standard aging heat treatment that depicts HAZ microcracking and propagation one of the crack into weld metal.

Welds produced on Inconel 738 and GTD 111 alloy using standard welding wire Inconel 625, Haynes 230 and welding wire with a chemical composition corresponding to the Weld Metal 1 exhibited unacceptable HAZ micro cracking as shown in Table 2. The HAZ of Weld Metal 2A that comprised 0.25 wt. % B and 0.45 wt. % C exhibited HAZ cracking in as welded and heat treated conditions. Furthermore, elevated content of carbon in Weld Metal 2A resulted in a propagation of cracks from HAZ into welds as shown in FIG. 7 due to reduced ductility of these welds.

Therefore, welding wire with a chemical composition corresponding to Weld Metal 1 and 2A with content of boron below of 0.25-0.3 wt. % wt. % should not be used for a repair of critical engine components manufacturing of nickel based superalloys with high content of gamma prime phase such as GTD 111 and IN738.

TABLE 1

Chemical Composition of Ni and Fe Based Alloys in Wt. %

| Weld Metal | Ni | Cr | Mo | Nb | B | C | W | Ti | Si | Mn | Fe |
|---|---|---|---|---|---|---|---|---|---|---|---|
| Inconel 625 Base Line | To balance | 20 23 | 8 10 | 3.15 4.14 | — | 0.1 | — | — 0.4 | — 0.5 | — 0.5 | — 5.0 |
| 1 | To balance | 20 23 | 8 10 | 3.15 4.14 | 0.2 | 0.1 | — | — 0.4 | — 0.5 | — 0.5 | — 5.0 |
| 2A | To balance | 20 23 | 8 10 | 3.15 4.14 | 0.25 | 0.45 | — | — 0.4 | — 0.5 | — 0.5 | — 5.0 |
| 2 | To balance | 20 23 | 8 10 | 3.15 4.14 | 0.30 | 0.1 | — | — 0.4 | — 0.5 | — 0.5 | — 5.0 |
| 3 | To balance | 20 23 | 8 10 | 3.15 4.14 | 0.40 | 0.25 | — | — 0.4 | — 0.5 | — 0.5 | — 5.0 |
| 4 | To balance | 20 23 | 8 10 | 3.15 4.14 | 0.40 | 0.50 | — | — 0.4 | — 0.5 | — 0.5 | — 5.0 |
| 5 | To balance | 20 23 | 8 10 | 3.15 4.14 | 0.60 | 0.65 | — | — 0.4 | — 0.5 | — 0.5 | 5.0 — |
| 6 | To balance | 20 23 | 8 10 | 3.15 4.14 | 0.80 | 0.80 | — | — 0.4 | — 0.5 | — 0.5 | — 5.0 |
| 7 | To balance | 20 23 | 8 10 | 3.15 4.14 | 1.00 | 1.25 | — | — 0.4 | — 0.5 | — 0.5 | — 5.0 |
| 8 | To balance | 20 23 | 8 10 | 3.15 4.14 | 0.85 | 1.2 | — | — 0.4 | — 0.5 | — 0.5 | — 5.0 |
| 347 SS Base Line | 9 13 | 17 20 | — 0.75 | 0.1 0.4 | — | — 0.07 | — | — | 0.3 1.0 | 1.0 2.0 | To balance |

TABLE 1-continued

Chemical Composition of Ni and Fe Based Alloys in Wt. %

| Weld Metal | Ni | Cr | Mo | Nb | B | C | W | Ti | Si | Mn | Fe |
|---|---|---|---|---|---|---|---|---|---|---|---|
| 9 | 9 | 17 | — | 0.1 | 0.3 | 0.2 | — | — | 0.3 | 1.0 | To |
|   | 13 | 20 | 0.75 | 0.4 | 0.35 | 0.25 |   |   | 1.0 | 2.0 | balance |
| 349 SS | 8.0 | 19 | 0.35 | 1.0 | — | 0.07 | 1.25 | 0.1 | 0.3 | 1.0 | To |
| Base Line | 9.5 | 22 | 0.65 | 1.4 |   | 0.13 | 1.75 | 0.3 | 0.65 | 2.0 | balance |
| 10 | 8.0 | 19 | 0.35 | 1.0 | 0.4 | 0.3 | 1.25 | 0.1 | 0.3 | 1.0 | To |
|   | 9.5 | 22 | 0.65 | 1.4 | 0.45 | 0.35 | 1.75 | 0.3 | 0.65 | 2.0 | balance |

TABLE 2

Tensile Properties of Nickel Based Clad Welds at 982° C. (1800° F.) and Susceptibility of HAZ to Cracking

| Weld Metal | 0.2% Offset Yield Strength, KSI | Ultimate Tensile Strength, KSI | Elongation, % | Weld & HAZ Cracking of IN738 Alloy | Weld & HAZ Cracking of GTD111 Alloy |
|---|---|---|---|---|---|
| Inconel 625 Standard Base Line[1] | 12.1 | 24.1 | 43.8 | HAZ Cracking | HAZ Cracking |
| Haynes 230 Standard Base Line[2] | 24.8 | 29.4 | 25.5 | HAZ Cracking | HAZ Cracking |
| 1 | — | — | — | HAZ Cracking | HAZ Cracking |
| 2A | — | — | — | Weld and HAZ Cracking | Weld and HAZ Cracking |
| 2 | — | — | — | No Cracks | HAZ Cracking |
| 3 | 24.5 | 30.0 | 22.5 | No Cracks | No Cracks |
| 6 | 29.3 | 34.5 | 7.5 | No Cracks | No Cracks |
| 7 | — | — | — | Weld Solidification Shrinkage Exceeding 0.004 inch in Length | Weld Solidification Shrinkage Exceeding 0.004 inch in Length |
| 8 | — | — | — | Weld Solidification Shrinkage Exceeding 0.004 inch in Length | Weld Solidification Shrinkage Exceeding 0.004 inch in Length |

Note:
[1],[2]Weld metals produced using standard Inconel 625 and Haynes 230 welding wires were tested to obtain base line data for a comparison. Other weld alloys that produced HAZ or exhibited cracking and other unacceptable weld discontinuities such as solidification shrinkage were rejected and therefore were not subjected to mechanical testing.

TABLE 3

Rupture Properties of Inconel 625, Haynes 230 and Alloy 3 Clad Welds at a Temperature of 982° C. (1800° F.)

| Material | Stresses, KSI | Rupture Time, Hours |
|---|---|---|
| Inconel 625 Standard Base Line | 8 | 1.8 |
| Haynes 230 Standard Base Line | 8.0 | 10 |
| Weld Metal 3 | 8.0 | 242.8 |
| Weld Metal 6 | 8.0 | 112.3 |

TABLE 4

Mechanical Properties of Inconel 625 Butt Joints at a Room Temperature

| Weld Metal | Ultimate Tensile Strength, KSI | Elongation, % | Bend Angle, Deg. | Fracture Area |
|---|---|---|---|---|
| Standard Inconel 625 | 127 | 46 | 180 | HAZ |
| 3 | 129 | 38.5 | 180 | HAZ |

TABLE 5

Tensile Properties of Iron Based Clad Welds at 872° C. (1600° F.)

| Weld Metal | 0.2% Offset Yield Strength, KSI | Ultimate Tensile Strength, KSI | Elong. % | Weld & HAZ Cracking of A286 Alloy |
| --- | --- | --- | --- | --- |
| 347 SS Base Line Weld Metal | 16.9 | 18.4 | 51.8 | No cracks |
| Weld Metal 9 | 22.2 | 29.2 | 18.9 | No crack |
| 349 SS Base Line Weld Metal | 10.5 | 16.3 | 80 | No crack |
| Weld Metal 10 | 19.6 | 27.4 | 44.9 | No crack |

TABLE 6

Microhardness of Iron Based Clad Welds at Room Temperature

| Weld Metal | VHN (300 g) |
| --- | --- |
| 347 SS Base Line Weld Metal | 165 |
| 9 | 237 |
| 349 SS Base Line Weld Metal | 184 |
| 10 | 256 |

Figure 8:
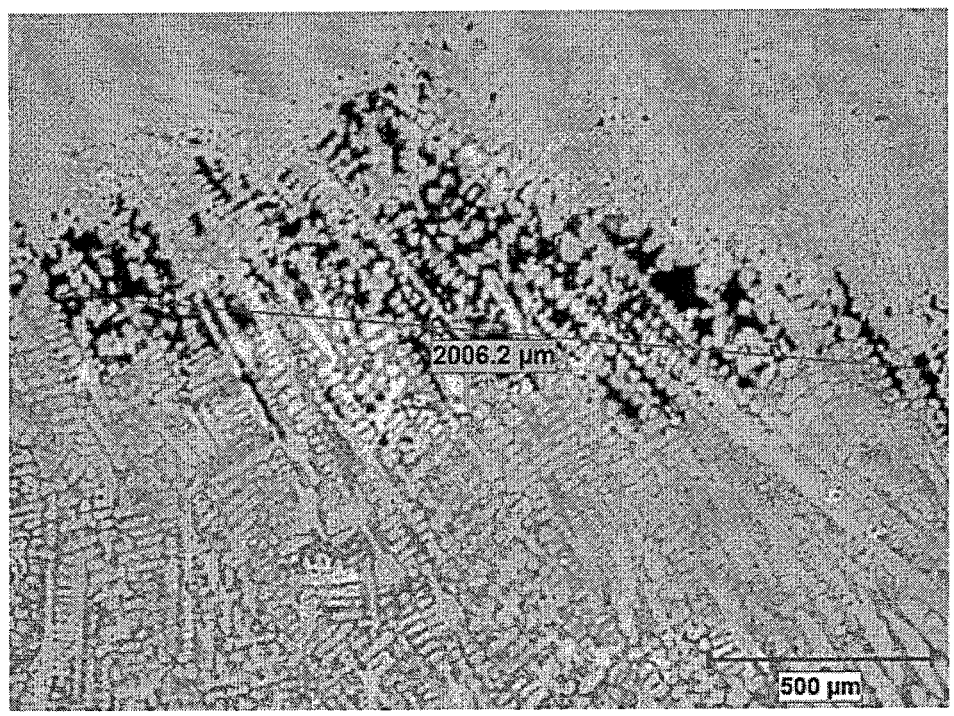
FIG. 8 is a micrograph of the weld that was produced on GTD 111 nickel base superalloy using welding rods comprised 0.85 wt. % B and 1.2 wt. % C after annealed heat treatment at a temperature of 1205° C. that depicts unacceptable interdendritic solidification shrinkage.

HAZ of Weld Metals 7 and 8 with boron content of 1.0 wt. % and 0.85 wt. % respectively and carbon 1.25 wt. % and 1 wt. % respectively was free of cracks but welds exhibited interdendritic shrinkage as shown in FIG. 8 and were considered unacceptable Welds produced on iron based A286 alloy using standard 347 and 349 welding materials had low tensile properties at 872° C. (1600° F.) and hardness that did not allow using of these materials for a repair neither airfoils nor air seal fins respectively. Addition of B and C increased yield strength of clad welds by 30-86% and hardness by more than 40% as shown in Tables 5 and 6 respectively. These welds were also free of cracks.

Therefore, as follows from examples above, invented welding alloy that comprised from about 0.3 wt. % to 0.8 wt. % B and from about 0.2 wt. % C to 0.8 wt. % C produced crack free welds on nickel based Inconel 738 and GTD 111 superalloys and iron based A286 alloy. These welds had superior mechanical properties due to a formation of cuboidal borides and carbides in respectively nickel and iron based matrix allowing manufacturing and repair of turbine engine components manufacturing of various nickel and iron based superalloys.

The invention claimed is:

1. A welding material comprised of the following elements in weight percentages:
 a) Boron: from about 0.3 to 0.6 wt. %,
 b) Carbon: from about 0.2 to 0.5 wt. %,
 c) Chromium: from about 17 to 25 wt. %
 d) Molybdenum: from about 6 to 12 wt. %
 e) Iron: from about trace amount to 5 wt. %,
 f) Niobium from 3 to 4.5 wt %
 g) Nickel with impurities: to balance,
 wherein the weld material is adapted to minimize weld and heat affected zone cracking when welding onto superalloy base materials.

2. The welding material claimed in claim 1 wherein the weld material is adapted to produce hot rupture properties at least equal to the base material when welding onto superalloy base materials.

3. The welding material claimed in claim 1 wherein the Chromium content comprises from about 18 to 23 wt. %.

4. The welding material claimed in claim 3 wherein the Molybdenum content comprises from about 8 to 10 wt. %.

* * * * *